US008238419B2

(12) United States Patent
Chui et al.

(10) Patent No.: US 8,238,419 B2
(45) Date of Patent: Aug. 7, 2012

(54) DISPLAYING VIDEO AT MULTIPLE RESOLUTION LEVELS

(75) Inventors: Charles K. Chui, Menlo Park, CA (US); Haishan Wang, San Carlos, CA (US); Dongfang Shi, Mountain View, CA (US)

(73) Assignee: Precoad Inc., Menlo Park, CA (US)

( * ) Notice: Subject to any disclaimer, the term of this patent is extended or adjusted under 35 U.S.C. 154(b) by 988 days.

(21) Appl. No.: 12/145,453

(22) Filed: Jun. 24, 2008

(65) Prior Publication Data

US 2009/0316795 A1 Dec. 24, 2009

(51) Int. Cl.
*H04N 7/12* (2006.01)
(52) U.S. Cl. ......... 375/240.01; 375/240.08; 375/240.25
(58) Field of Classification Search ............. 375/240.01, 375/240.08, 240.25
See application file for complete search history.

(56) References Cited

U.S. PATENT DOCUMENTS

| | | | | |
|---|---|---|---|---|
| 4,344,086 | A | 8/1982 | Mizuno | 358/78 |
| 5,533,138 | A | 7/1996 | Kim et al. | 382/232 |
| 6,041,143 | A | 3/2000 | Chui et al. | 382/232 |
| 6,246,797 | B1 | 6/2001 | Castor et al. | 382/232 |
| 6,809,758 | B1 * | 10/2004 | Jones | 348/208.99 |
| 2002/0001350 | A1 | 1/2002 | Wu et al. | 375/240 |
| 2004/0184523 | A1 * | 9/2004 | Dawson et al. | 375/240.1 |
| 2004/0218099 | A1 | 11/2004 | Washington | |
| 2004/0223058 | A1 * | 11/2004 | Richter et al. | 348/207.1 |
| 2004/0264791 | A1 * | 12/2004 | Jiang et al. | 382/239 |
| 2006/0176951 | A1 * | 8/2006 | Berman et al. | 375/240.01 |
| 2007/0024706 | A1 * | 2/2007 | Brannon et al. | 348/142 |
| 2007/0040890 | A1 * | 2/2007 | Morioka et al. | 348/14.01 |
| 2007/0076951 | A1 * | 4/2007 | Tanaka et al. | 382/181 |
| 2007/0160299 | A1 * | 7/2007 | Kajiwara et al. | 382/240 |
| 2007/0192722 | A1 * | 8/2007 | Kokubo | 715/771 |
| 2008/0144711 | A1 | 6/2008 | Chui et al. | |

FOREIGN PATENT DOCUMENTS

JP 11032328 2/1999

OTHER PUBLICATIONS

Pyy, H., et al., "Virtual Magnifying Glass 3.3," http://magnifier.sourceforge.net, Aug. 13, 2007, pp. 1-8.
International Search Report for International Application No. PCT/US2007/084941, dated Feb. 27, 2008.
International Search Report and Written Opinion for PCT/US2009/046686 dated Dec. 23, 2009.

* cited by examiner

*Primary Examiner* — Andrew Lee
(74) *Attorney, Agent, or Firm* — Morgan, Lewis & Bockius LLP

(57) ABSTRACT

A method of displaying video includes receiving a video bitstream corresponding to a video. The video comprises a sequence of frames having an associated video resolution level. At least a portion of the video bitstream is decoded. A background region of the video is displayed at a first video resolution level and a window region of the video is displayed at a second video resolution level. The second video resolution level is higher than the first video resolution level.

20 Claims, 14 Drawing Sheets

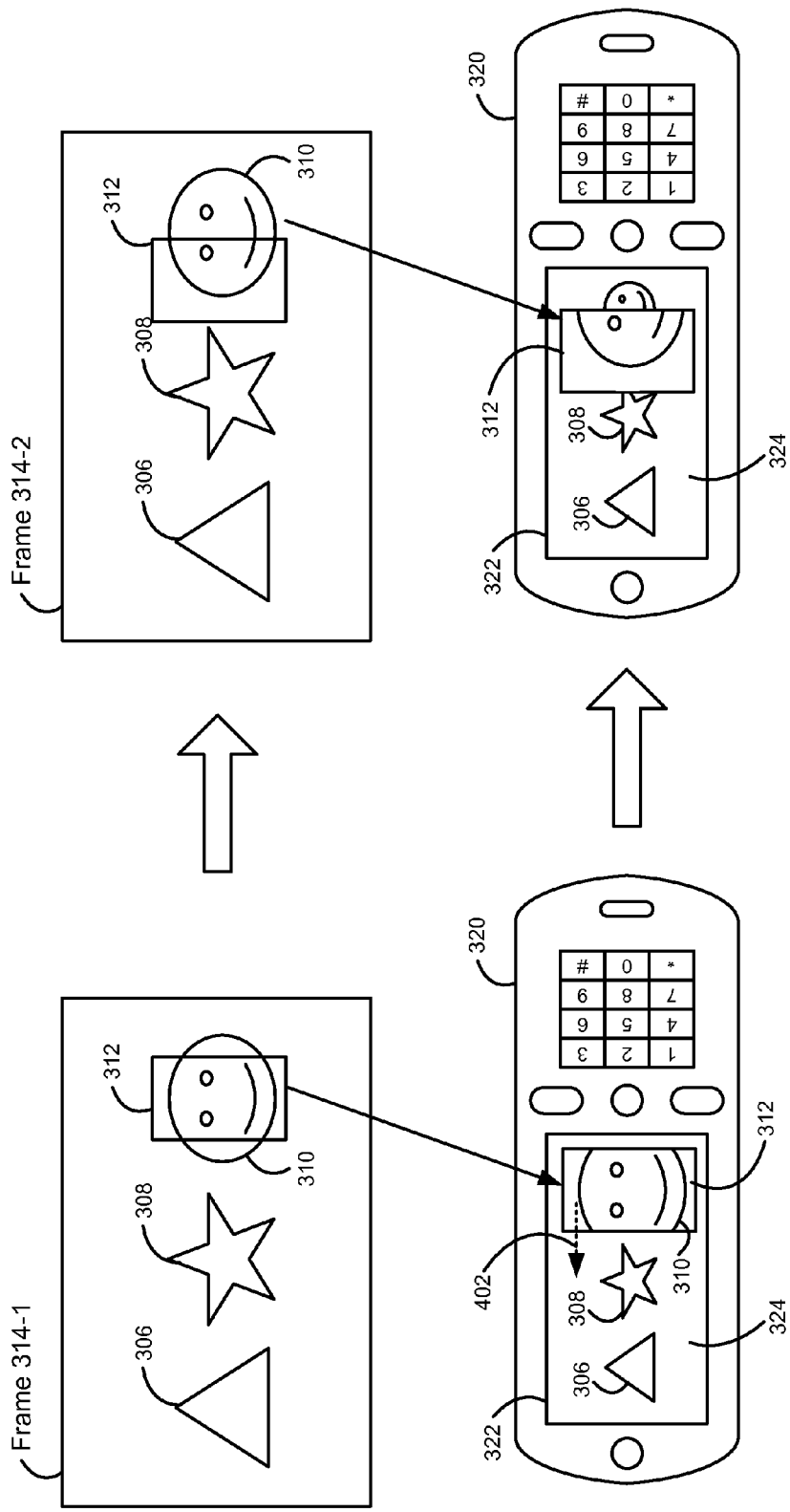

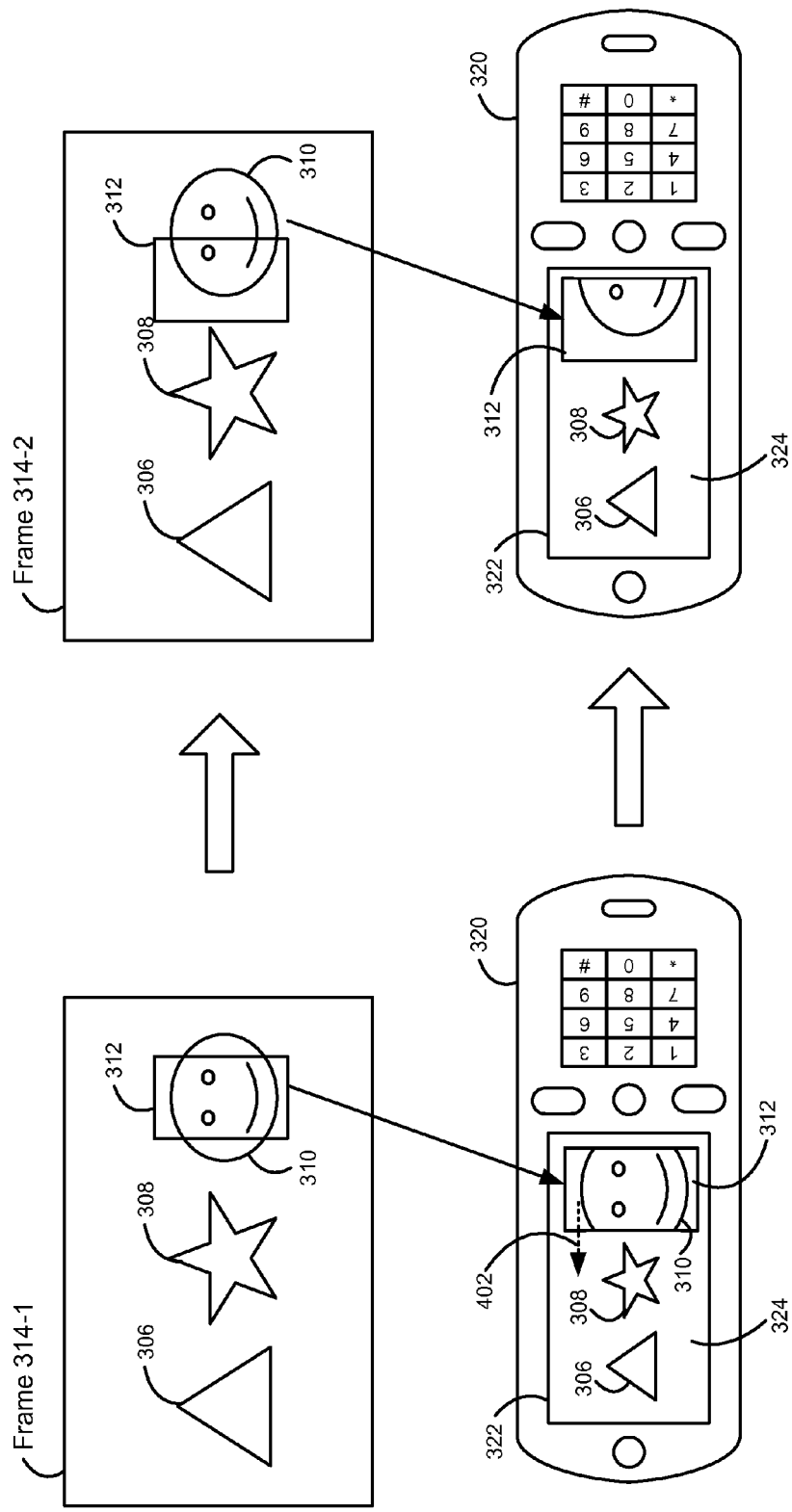

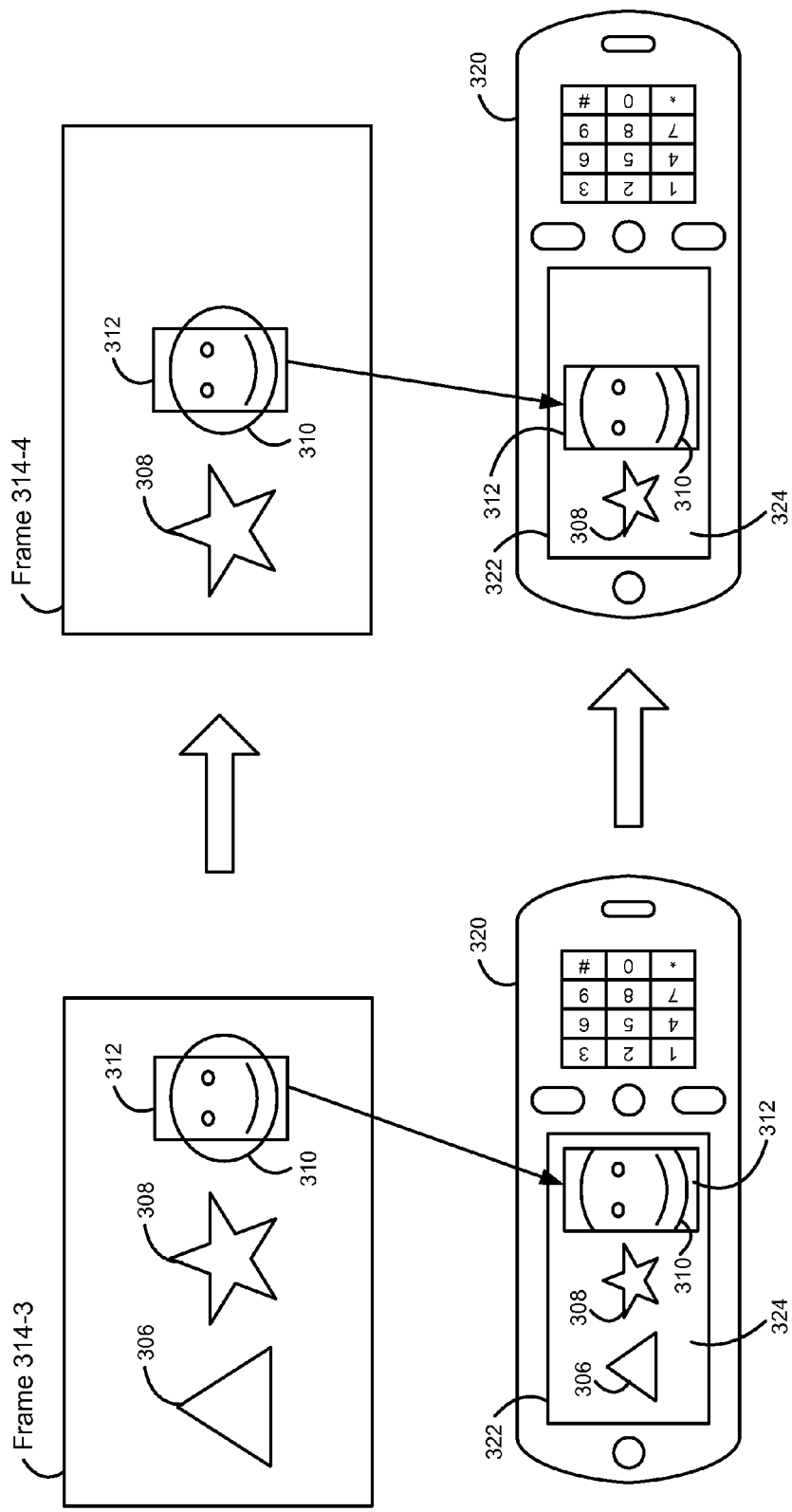

DISPLAYING VIDEO AT MULTIPLE RESOLUTION LEVELS

RELATED APPLICATIONS

This application is related to U.S. patent application Ser. No. 11/639,780, titled "Encoding Video at Multiple Resolution Levels," filed Dec. 15, 2006, and to U.S. patent application Ser. No. 12/173,768, titled "Providing and Displaying Video at Multiple Resolution Levels and Quality Levels," filed Jul. 15, 2008, both of which are hereby incorporated by reference in their entireties.

TECHNICAL FIELD

The disclosed embodiments relate generally to displaying video, and more particularly, to a method and system for simultaneously displaying respective regions of a video at distinct video resolution levels.

BACKGROUND

Many modern devices for displaying video, such as high-definition televisions, computer monitors, and cellular telephone display screens, allow users to manipulate the displayed video by zooming. In traditional systems for zooming video, the displayed resolution of the video does not increase as the zoom factor increases, causing the zoomed video to appear blurry and resulting in an unpleasant viewing experience. Furthermore, users also may desire to zoom in on only a portion of the displayed video and to view the remainder of the displayed video at a lower resolution.

SUMMARY

In an aspect of the present invention, a method of displaying video includes receiving a video bitstream corresponding to a video. The video comprises a sequence of frames having an associated video resolution level. At least a portion of the video bitstream is decoded. A background region of the video is displayed at a first video resolution level and a window region of the video is displayed at a second video resolution level. The second video resolution level is higher than the first video resolution level.

In another aspect, a method of displaying video includes receiving a plurality of video bitstreams corresponding to a video. Each video bitstream in the plurality corresponds to a sequence of frames having a distinct respective video resolution level. At least respective portions of the received video bitstreams are decoded. Two or more of the decoded video bitstreams, or portions thereof, are displayed in respective regions on a display screen.

In yet another aspect, a device for displaying video includes memory, one or more processors, and one or more programs stored in the memory and configured for execution by the one or more processors. The one or more programs include instructions to receive a video bitstream corresponding to a video. The video comprises a sequence of frames having an associated video resolution level. The one or more programs also include instructions to decode at least a portion of the video bitstream and instructions to display a background region of the video at a first video resolution level and a window region of the video at a second video resolution level. The second video resolution level is higher than the first video resolution level.

In yet another aspect, a computer readable storage medium stores one or more programs for use in displaying video. The one or more programs, which are configured to be executed by a device for displaying video, include instructions to receive a video bitstream corresponding to a video. The video comprises a sequence of frames having an associated video resolution level. The one or more programs also include instructions to decode at least a portion of the video bitstream and instructions to display a background region of the video at a first video resolution level and a window region of the video at a second video resolution level. The second video resolution level is higher than the first video resolution level.

In yet another aspect, a device for displaying video includes means for receiving a video bitstream corresponding to a video. The video comprises a sequence of frames having an associated video resolution level. The device also includes means for decoding at least a portion of the video bitstream and means for displaying a background region of the video at a first video resolution level and a window region of the video at a second video resolution level. The second video resolution level is higher than the first video resolution level.

BRIEF DESCRIPTION OF THE DRAWINGS

FIG. 4A-4F illustrate translation of a window region in a display in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
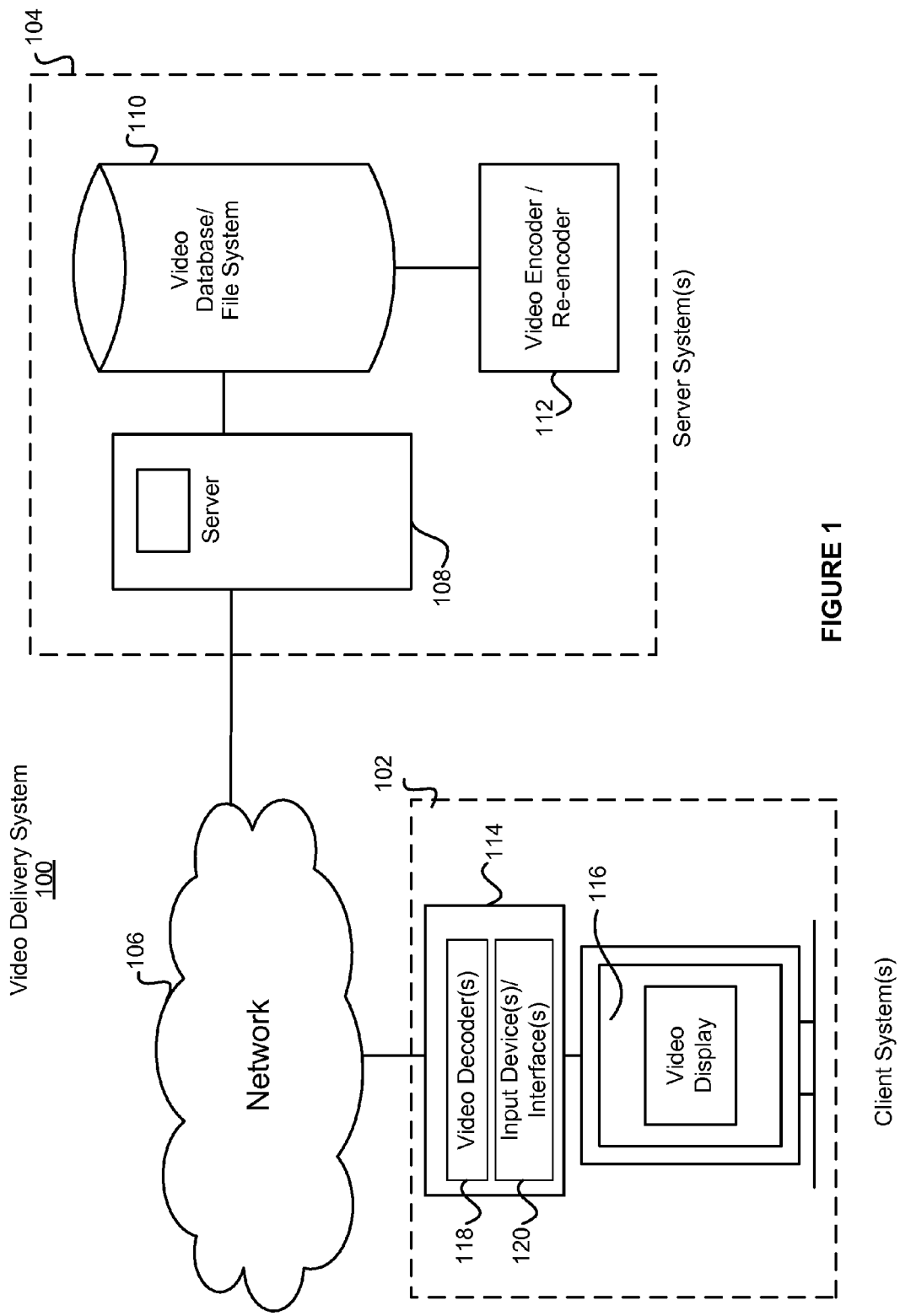
FIG. 1 is a block diagram illustrating a video delivery system in accordance with some embodiments.

FIG. 1 is a block diagram illustrating a video delivery system in accordance with some embodiments. The video delivery system 100 includes a server system 104. The server system 104 is coupled to one or more client devices or systems 102 by a network 106. The network 106 may be any suitable wired and/or wireless network and may include a cellular telephone network, a cable television network, satellite transmission, telephone lines, a local area network (LAN), a wide area network (WAN), the Internet, a metropolitan area network (MAN), WIFI, WIMAX, or any combination of such networks.

The server system 104 includes a server 108 and a video database or file system 110. In some embodiments, the server system 104 also includes a video encoder/re-encoder 112. Server 108, which serves as a front-end for the server system 104 and provides an interface between the server system 104 and the client systems 102, retrieves video from the video database or file system 110 and transmits the retrieved video to one or more client systems 102.

In some embodiments, video data is stored in the video database or file system 110 in one or more standard video formats, such as motion JPEG (M-JPEG), MPEG-2, MPEG-4, H.263, H.264, or any other official or defacto standard video format. In some embodiments, the video encoder/re-encoder 112 re-encodes video data received from the video database or file system 110. The re-encoded video data may be stored in the video database or file system 110 as well. In some embodiments, the re-encoded video data includes a sequence of multi-level frames that may be partitioned into tiles. Generation of multi-level frames and partitioning of frames into tiles is described in U.S. patent application Ser. No. 11/639,780, titled "Encoding Video at Multiple Resolution Levels," filed Dec. 15, 2006, which is hereby incorporated by reference in its entirety.

In some embodiments, the functions of server 108 may be divided or allocated among two or more servers. In some embodiments, the server system 104, including the server 108, the video database or file system 110, and the video encoder/re-encoder 112 may be implemented as a distributed system of multiple computers and/or video processors. However, for convenience of explanation, the server system 104 is described below as being implemented on a single computer, which can be considered a single logical system.

A user interfaces with the server system 104 and views video at a client system or device 102 (hereinafter called the client system for ease of reference). The client system 102 includes a computer 114 or computer-controlled device, such as a set-top box (STB), cellular telephone, smart phone, person digital assistant (PDA), or the like. The computer 114 typically includes one or more processors (not shown); memory, which may include volatile memory (not shown) and non-volatile memory such as a hard disk drive (not shown); one or more video decoders 118; and a display 116. The video decoders 118 may be implemented in hardware or in software. In some embodiments, the computer-controlled device 114 and display 116 are separate devices (e.g., a set-top box or computer connected to a separate monitor or television or the like), while in other embodiments they are integrated. For example, the computer-controlled device 114 may be a portable electronic device, such as a cellular telephone, personal digital assistant (PDA), or portable music and video player, that includes a display screen. In another example, the computer-controlled device 114 is integrated into a television. The computer-controlled device 114 includes one or more input devices or interfaces 120. Examples of input devices 120 include a keypad, touchpad, touch screen, remote control, keyboard, or mouse. In some embodiments, a user may interact with the client system 102 via an input device or interface 120 to display a first region of video at a first video resolution and a second region of video at a second video resolution on the display 116.

Figure 2:
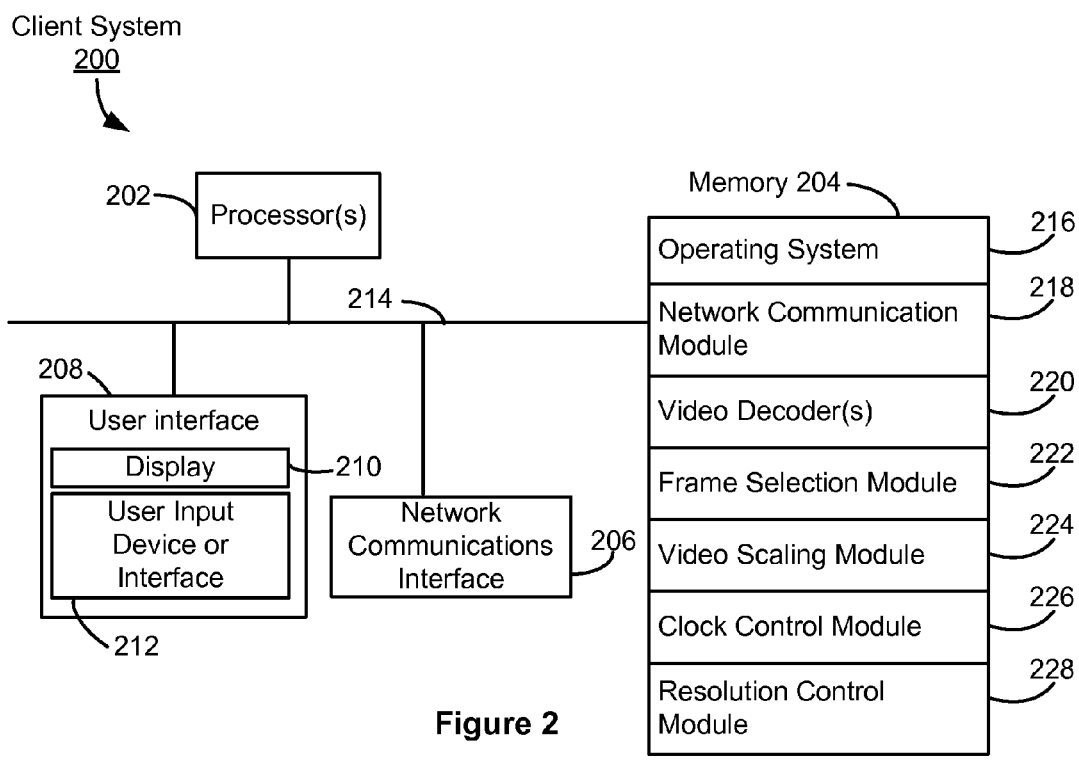
FIG. 2 is a block diagram illustrating a client system in accordance with some embodiments.

FIG. 2 is a block diagram illustrating a client system 200 in accordance with some embodiments. The client system 200 typically includes one or more processors 202, one or more network or other communications interfaces 206, memory 204, and one or more communication buses 214 for interconnecting these components. The one or more network or other communications interfaces 206 allow reception of data (e.g., video bitstreams) through a network connection and may include a port for establishing a wired network connection and/or an antenna for establishing a wireless network connection, along with associated receiver circuitry. The communication buses 214 may include circuitry (sometimes called a chipset) that interconnects and controls communications between system components. The client system 200 may also include a user interface 208 that includes a display device 210 and a user input device or interface 212. In some embodiments, user input device or interface 212 includes a keypad, touchpad, touch screen, remote control, keyboard, or mouse. Alternately, user input device or interface 212 receives user instructions or data from one or more such user input devices. Memory 204 includes high-speed random access memory, such as DRAM, SRAM, DDR RAM or other random access solid-state memory devices, and may include non-volatile memory, such as one or more magnetic disk storage devices, optical disk storage devices, flash memory devices, or other non-volatile solid-state storage devices. Memory 204 may optionally include one or more storage devices remotely located from the processor(s) 202. Memory 204, or alternately the non-volatile memory device(s) within memory 204, comprises a computer readable storage medium. In some embodiments, memory 204 stores the following programs, modules, and data structures, or a subset thereof:

- an operating system 216 that includes procedures for handling various basic system services and for performing hardware-dependent tasks;
- a network communication module 218 that is used for connecting the client system 200 to other computers via the one or more communication network interfaces 206 and one or more communication networks, such as the Internet, other wide area networks, local area networks, metropolitan area networks, and the like;
- a video decoder module 220 for decoding received video;
- a frame selection module 222 for selecting frames or portions of frames of received video for display;
- a video scaling module 224 for scaling the resolution level of received video or portions thereof;
- a clock control module 226 for synchronizing frames or portions of frames for display; and
- a resolution control module 228 for determining video resolution levels at which to display respective regions of video.

In some embodiments, received video may be cached locally in memory 204.

Each of the above identified elements 216-228 in FIG. 2 may be stored in one or more of the previously mentioned memory devices. Each of the above identified modules corresponds to a set of instructions for performing a function described above. The above identified modules or programs (i.e., sets of instructions) need not be implemented as separate software programs, procedures, or modules, and thus various subsets of these modules (or sets of instructions) may be combined or otherwise re-arranged in various embodiments. In some embodiments, memory 204 may store a subset of the modules and data structures identified above. Furthermore, memory 204 may store additional modules and data structures not described above.

Figure 3A:
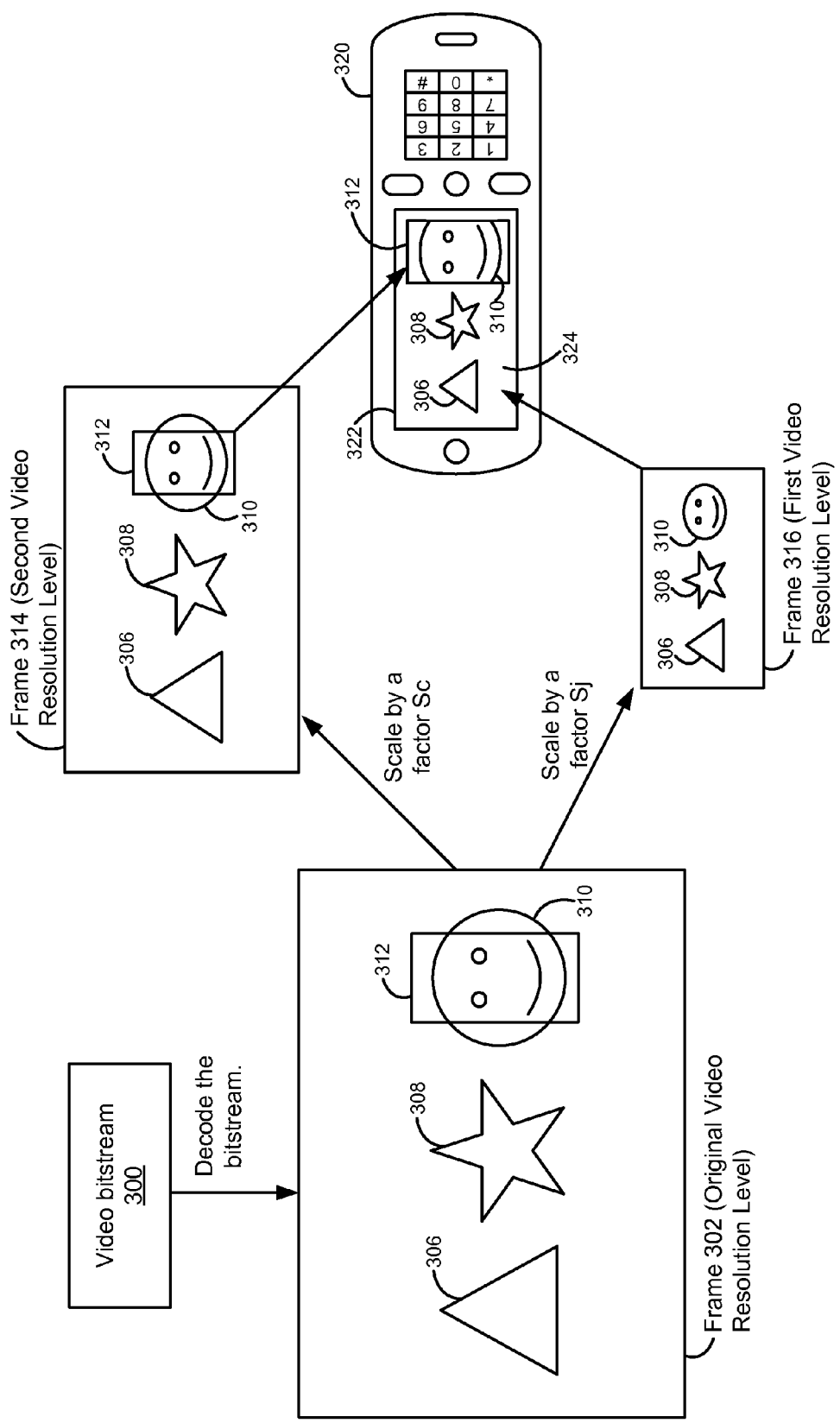
FIGS. 3A-3C are block diagrams illustrating display of a first region of video at a first video resolution and a second region of video at a second video resolution in accordance with some embodiments.
Figure 3B:
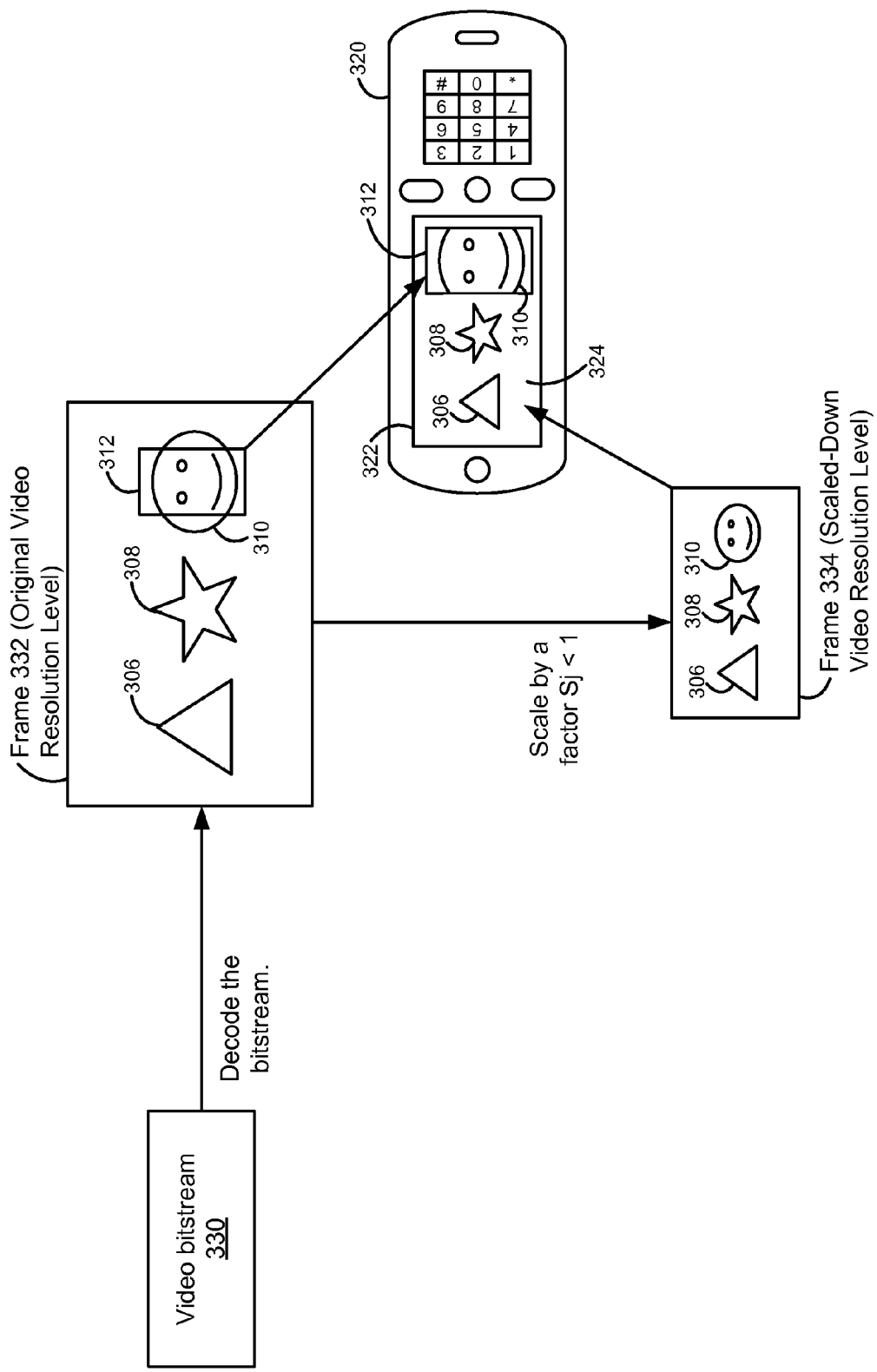
Figure 3C:
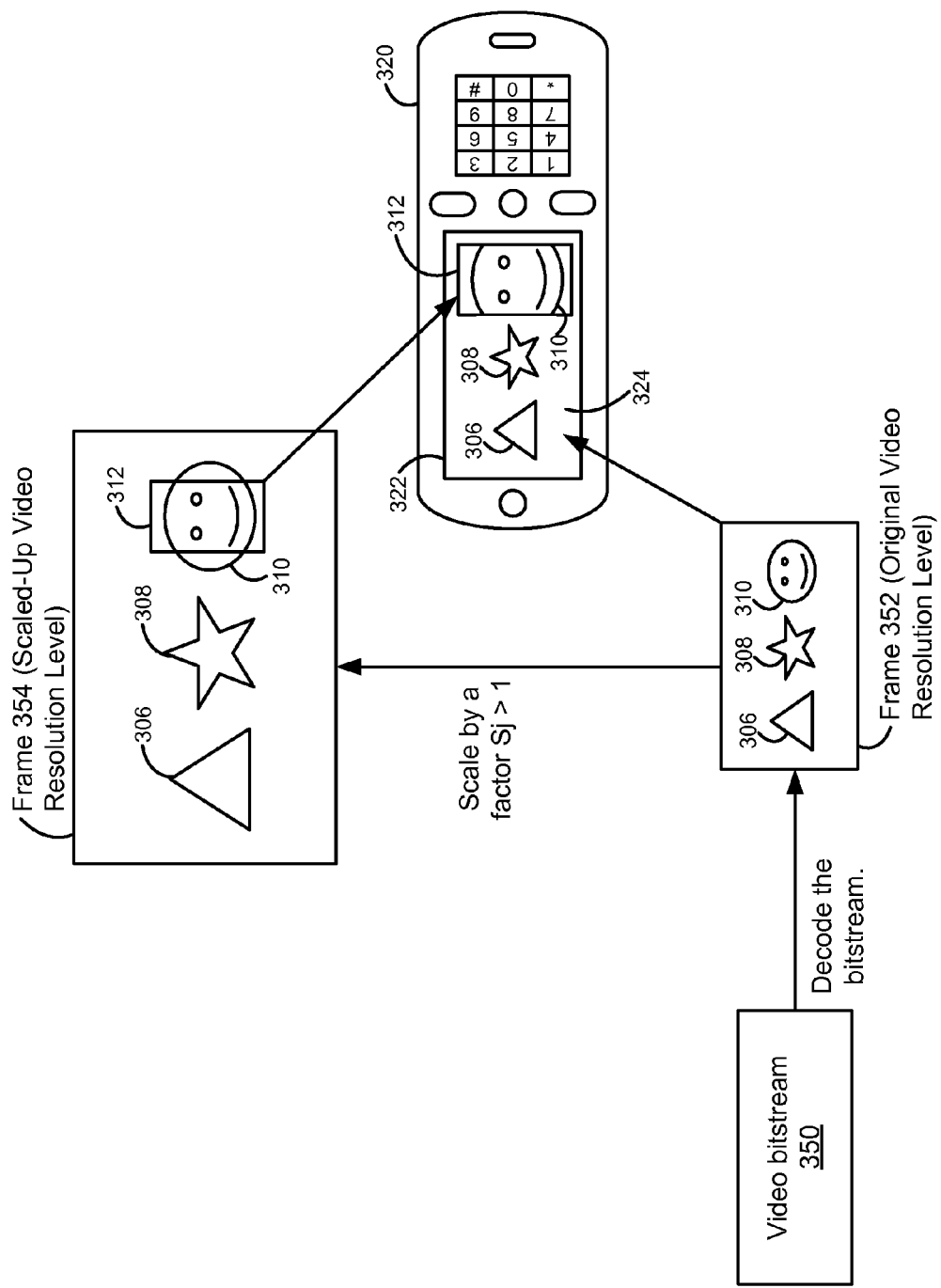

FIGS. 3A-3C are prophetic, schematic diagrams of video frames and the user interface of a client device 320, illustrating display of a first region of video at a first video resolution level and a second region of video at a second video resolution level in accordance with some embodiments. A video bitstream 300 is received at a client system (e.g., client system 102/200) and decoded by the client. In the example of FIGS. 3A-3C, the client system is a handheld client device 320 with a display screen 322. In some embodiments, the client device 320 receives the video bitstream 300 from a streaming server (e.g., server system 104). Alternately, the video bitstream 300 is stored as a file in the client device 320.

The decoded video bitstream includes a series of frames that have an original video resolution level. For example, in FIG. 3A, a frame 302 is shown at the original video resolution. The frame 302 is scaled by a factor Sj to produce a frame 316 at a first video resolution level and is scaled by a factor Sc to produce a frame 314 at a second video resolution level, such that the second video resolution level is higher than the first video resolution level. In some embodiments, in which the first and second video resolution levels are lower than the original video resolution level (i.e., the scaling factors Sj and Sc are less than one), the frames 314 and 316 may be produced by downsampling the frame 302. In other embodiments, one or both of the first and second video resolution levels may be higher than the original video resolution level (i.e., the corresponding scale factor or factors is greater than one). Frames may be scaled up using vertical resampling and horizontal resampling as described in ISO/IEC 13818-2, "Information Technology—Generic Coding of Moving Pictures and Associated Audio Information: Video," sections 7.7.3.5 and 7.7.3.6. The entire ISO/IEC 13818-2 standard is hereby incorporated by reference as background information. Scaling up of frames allows video to be displayed at high resolution even though the available bitstream is low resolution, which may occur when the network connection between the device 320 and a streaming server has low bandwidth.

A background region 324 is displayed at the first video resolution level and a window region 312 is displayed at the second video resolution level, such that the window region 312 appears to be superimposed on the background region 324. Objects (e.g., 306 and 308) in the background region 324 thus are displayed at the first video resolution level and objects (e.g., 310) in the window region 312 are displayed at the second video resolution level.

In some embodiments, video to be displayed in the background region 324 is synchronized with video to be displayed in the window region 312 using bit packing: the background region 324 at the first video resolution level and the window region 312 at the second video resolution level are combined into a single bitstream.

In some embodiments, the window region 312 has a user-selected display location. For example, if the display screen 322 of the client device 320 is a touch screen, a user can specify the location of the window region 312 by gesturing on the touch screen with a stylus or finger. In other examples, a user can specify the location of the window region by using a selection device such as a mouse or by using directional buttons on the client device or directional buttons on a remote control coupled to the client device. The size of the window region 312 may have a customizable system default value or may be specified by the user when specifying the location of the window region, for example by using a mouse to select a region on the display screen.

While the background region 324 in FIG. 3A corresponds to the entire frame 316, in other embodiments the background region corresponds to only a portion of the frames. In embodiments in which the background region corresponds to entire frames, the video resolution level of the background region may correspond to a maximum resolution at which the screen 322 can display the entire frames. In embodiments in which the background region corresponds to only a portion of the frames, the video resolution level of the background region may correspond to a user-specified zoom factor. The video resolution level of the window region 312 may correspond to a system default zoom factor or may be user-customized.

In some embodiments, only the portions of the frame 302 corresponding to the window region 312 and background region 324 are scaled. For example, if the frame 302 comprises macro-blocks of pixels, only macro-blocks within a respective region are scaled to the corresponding video resolution level. In some embodiments, if the frame 302 comprises tiles, only tiles within a respective region are scaled to the corresponding video resolution level.

In some embodiments, either the window region 312 or the background region 324 is displayed at the original video resolution level of the frames decoded from the bitstream. For example, in FIG. 3B a video bitstream 330 is decoded into a sequence of frames including frame 332, which has an original video resolution level. Frame 332 is scaled down (e.g., is downsampled) to produce a frame 334 with a scaled-down video resolution level. The window region 312 is displayed at the original video resolution level and the background region 324 is displayed at the scaled-down video resolution level. Objects (e.g., 306 and 308) in the background region 324 thus are displayed at the scaled-down video resolution level and objects (e.g., 310) in the window region 312 are displayed at the original video resolution level.

In FIG. 3C, a video bitstream 350 is decoded into a sequence of frames including frame 352, which has an original video resolution level. Frame 352 is scaled up to produce frame 354, which has a scaled-up video resolution level. The window region 312 is displayed at the scaled-up video resolution level and the background region 324 is displayed at the original video resolution level. Objects (e.g., 306 and 308) in the background region 324 thus are displayed at the original video resolution level and objects (e.g., 310) in the window region 312 are displayed at the scaled-up video resolution level.

In some embodiments, the window region 312 is translated in response to user input, as illustrated in FIGS. 4A-4D in accordance with some embodiments. FIGS. 4A-4D are prophetic, schematic diagrams of video frames and the user interface of a client device 320. In FIGS. 4A and 4C, window region 312 is displayed at a video resolution level corresponding to the video resolution level of frame 314-1 and the background region 324 is displayed at a lower video resolution level. User input 402 (FIGS. 4A and 4C) is received corresponding to an instruction to translate the window region 312. Examples of user input 402 include gesturing on the screen 322 with a stylus or finger, clicking and dragging with a mouse, or pressing a directional button on the device 320 or on a remote control for a client device. In response, the location of the window region 312 in frame 314-2 (FIGS. 4B and 4D) is shifted with respect to the location of the window region 312 in frame 314-1. In this example, frame 314-1 precedes the user input 402 and frame 314-2 follows the user input 402. In some embodiments, the display location of the window region 312 on the screen 322 also is translated in response to the user input 402, as illustrated in FIG. 4B. In other embodiments, the display location of the window region 312 on the screen 322 remains fixed, as illustrated in FIG. 4D. (For visual clarity, the objects 306, 308, and 310 are shown at the same location in frames 314-1 and 314-2; in general, of course, the location of objects in successive frames of a video may change.)

In some embodiments, the window region 312 is automatically translated, as illustrated in FIGS. 4E-4F in accordance with some embodiments. FIGS. 4E-4F are prophetic, schematic diagrams of video frames and the user interface of a client device 320. Frame 314-3 (FIG. 4E) precedes frame 314-4 (FIG. 4F) in a sequence of frames; in some embodiments, frames 314-3 and 314-4 are successive frames in the sequence. The location of objects in the frame 314-4 has changed with respect to the frame 314-3, corresponding to motion in the video. In this example, object 306 has moved out of the frame 314-4 and objects 308 and 310 have moved to the left. The window region 312 is automatically translated in accordance with the motion of the object 310. Thus, in some embodiments, automatic translation allows a display window to continue to display an object or set of objects at a heightened video resolution when the object or set of objects moves.

Figure 4G:
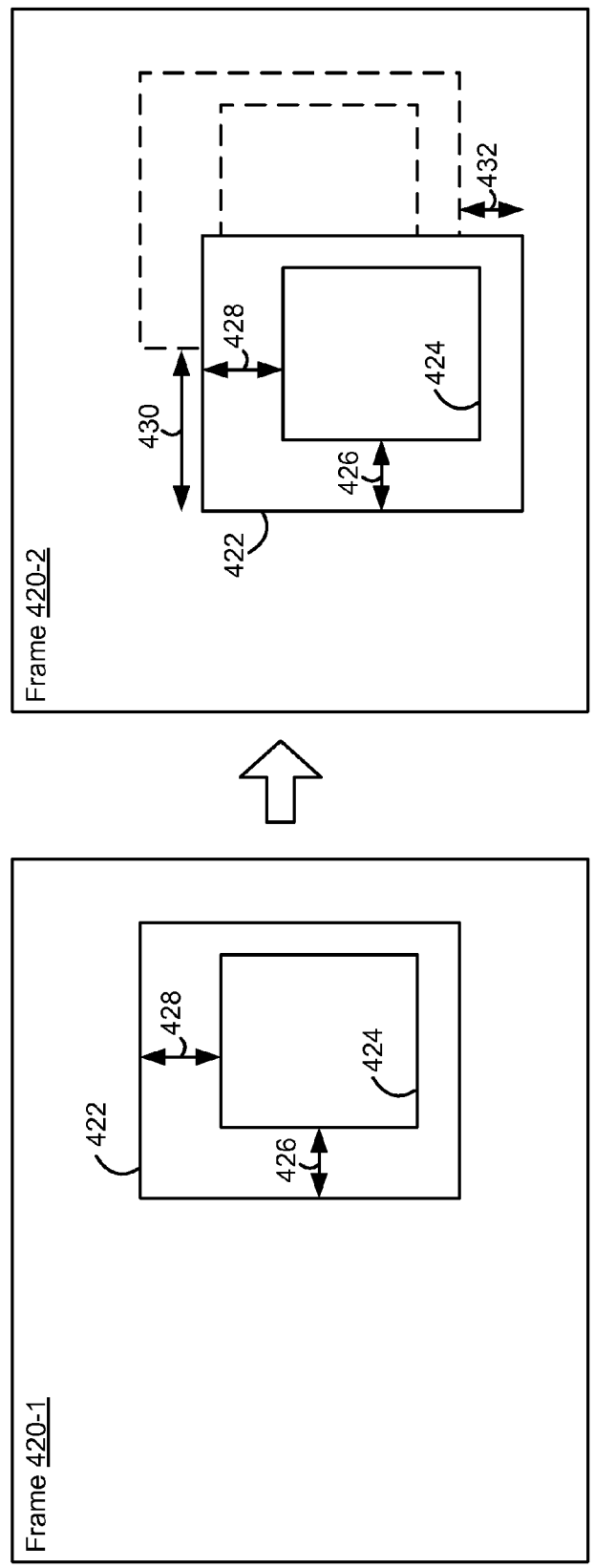
FIG. 4G is a block diagram illustrating two frames in a sequence of frames in accordance with some embodiments.
Figure 4H:
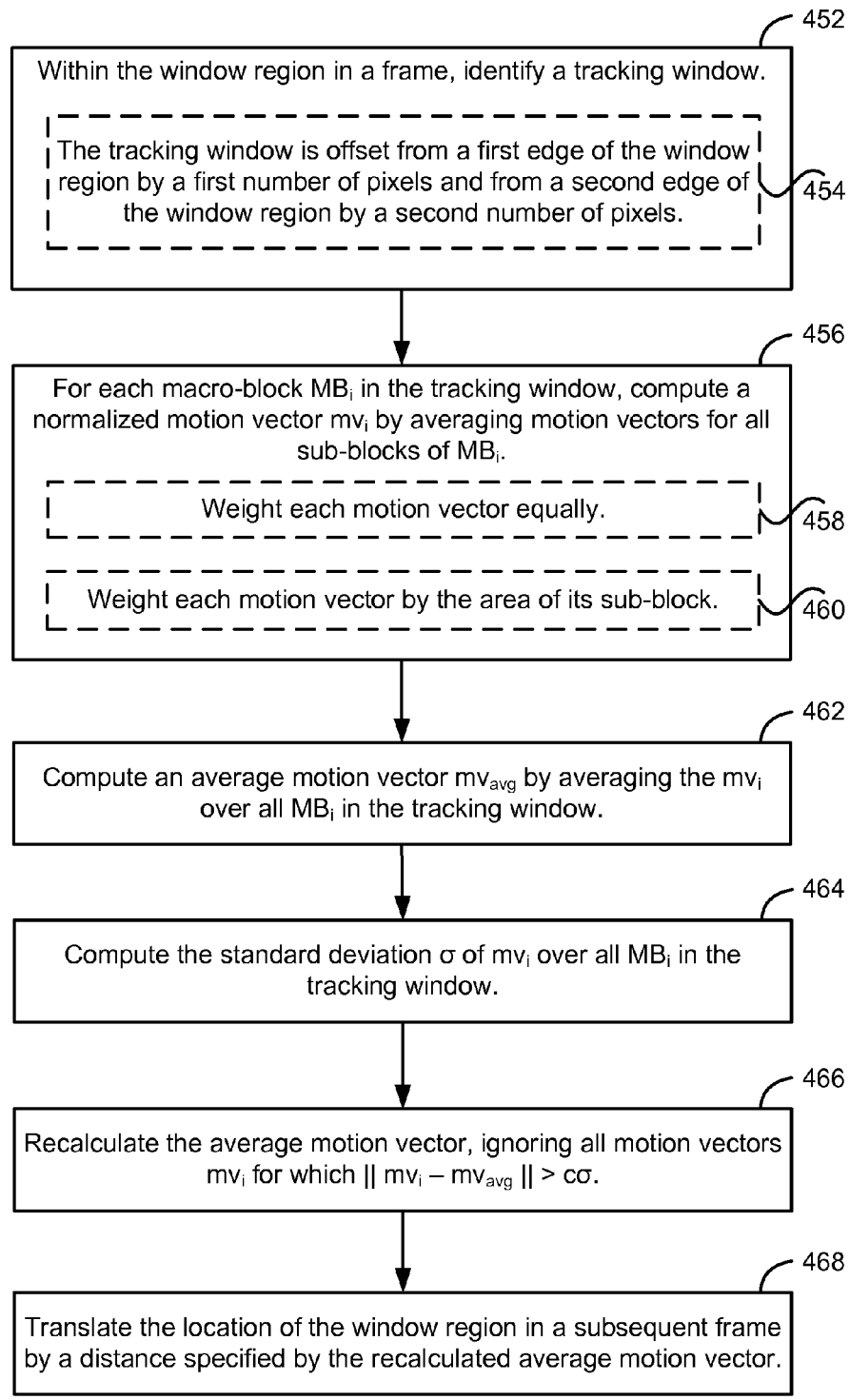
FIG. 4H is a flow diagram illustrating a method of implementing automatic translation of a window region in accordance with some embodiments.

FIG. 4H is a flow diagram illustrating a method 450 of implementing automatic translation of a window region in accordance with some embodiments. The method 450 is described with reference to FIG. 4G, which illustrates two frames 420-1 and 420-2 in a sequence of frames in accordance with some embodiments. In some embodiments, the frames 420-1 and 420-2 are successive frames in the sequence, with the frame 420-1 coming before the frame 420-2.

In the method 450, a tracking window 424 is identified (452) within a window region 422 in the frame 420-1. In some embodiments, the tracking window 424 is offset (454) from a first edge of the window region 422 by a first number of pixels 426 and from a second edge of the window region 422 by a second number of pixels 428. In some embodiments, the offsets 426 and 428 are chosen substantially to center the tracking window 424 within the window region 422. In some embodiments the offsets 426 and 428 are adjustable to allow the location of the tracking window 426 to correspond to the location of a potential object of interest identified within the window region 422.

For each macro-block $MB_i$ in the tracking window 424, a normalized motion vector $mv_i$ is computed (456) by averaging motion vectors for all sub-blocks of $MB_i$, where i is an integer that indexes respective macro-blocks In some embodiments, each motion vector is weighted equally (458) when averaging the motion vectors (e.g., for MPEG-2 and baseline MPEG-4). Alternatively, in some embodiments a weighted average of the motion vectors for all sub-blocks of $MB_i$ is calculated. For example, each motion vector is weighted by the area of its sub-block (460) (e.g., for H.264). In yet another example, the motion vectors of any non-moving sub-blocks is either excluded or given reduced weight (e.g., by a predefined multiplicative factor, such as 0.5) when computing the normalized motion vector for a respective macro-block.

An average motion vector $mv_{avg}$ is computed (462) by averaging the $mv_i$ over all $MB_i$ in the tracking window 424. The standard deviation ($\sigma$) is computed of the $mv_i$ over all $MB_i$ in the tracking window. The average motion vector is then recalculated (466), ignoring (i.e., excluding from the calculation) all motion vectors $mv_i$ for which $\|mv_i - mv_{avg}\| > c\sigma$. In some embodiments, c is an adjustable parameter. In some embodiments, c equals 1, or 3, or is in a range between 0.5 and 10. Alternately, or from a conceptual point of view, the recomputed average motion vector is an average of motion vectors $mv_i$ that excludes (from the computed average) non-moving macro-blocks and macro-blocks whose movement magnitude and/or direction is significantly divergent from the dominant movement (if any) within the tracking window.

The location of the window region is translated (468) in a subsequent frame by a distance specified by the recalculated average motion vector of operation 466. For example, the location of window region 422 in the frame 420-2 has been translated with respect to its location in the frame 420-1 by a horizontal distance 430 and a vertical distance 432, where the distances 430 and 432 are specified by the recalculated average motion vector of operation 466.

While the method 450 includes a number of operations that appear to occur in a specific order, it should be apparent that the method 450 can include more or fewer operations, which can be executed serially or in parallel (e.g., using parallel processors or a multi-threading environment), an order of two or more operations may be changed and/or two or more operations may be combined into a single operation. For example, operation 452 may be omitted and the remaining operations may be performed for the entire window region 422 instead of for the tracking window 424. However, use of a tracking window 424 saves computational cost and avoids unnecessary latency associated with the method 450.

Figure 5:
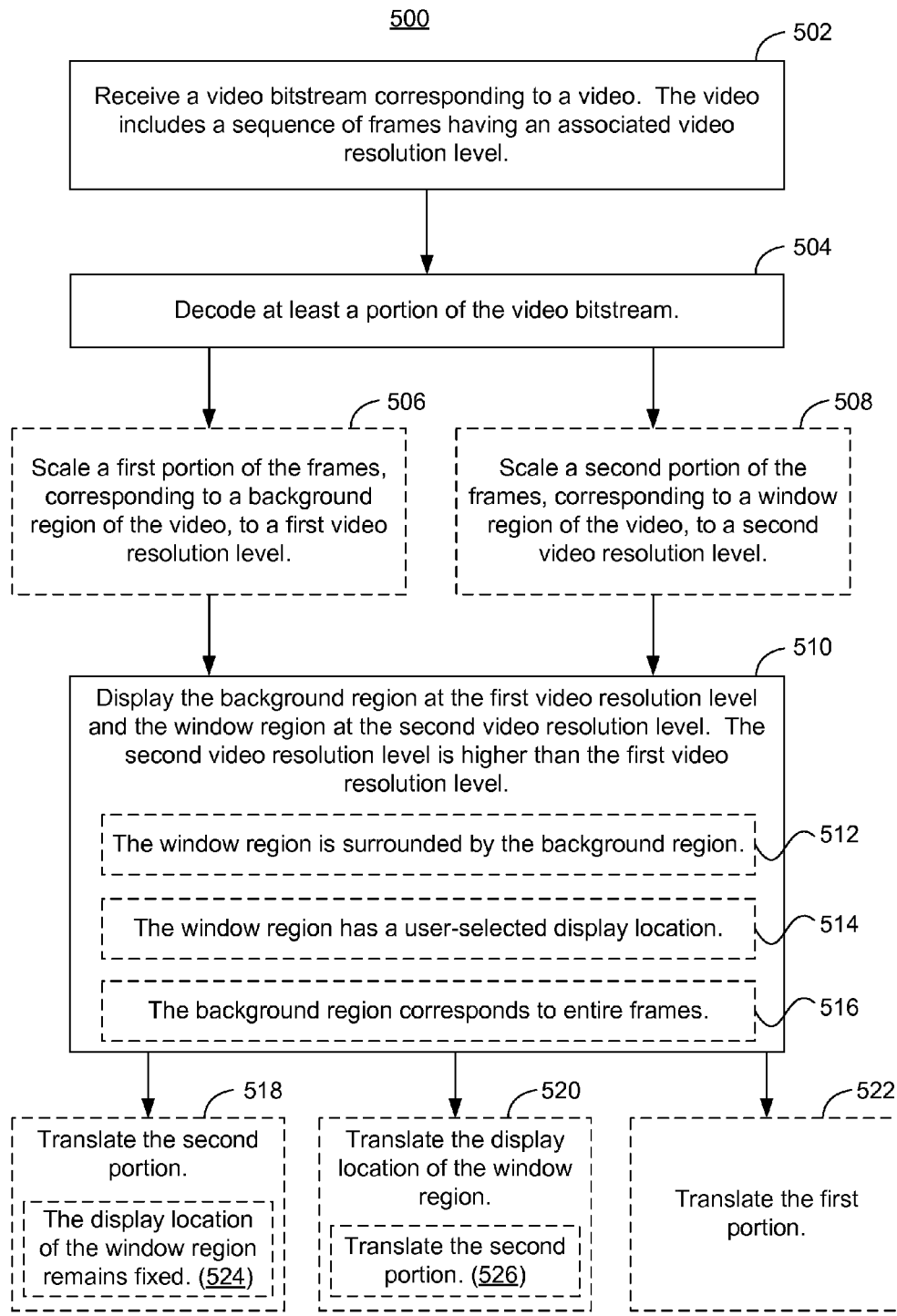
FIG. 5 is a flow diagram illustrating a method of displaying video in accordance with some embodiments.

FIG. 5 is a flow diagram illustrating a method 500 of displaying video in accordance with some embodiments. In the method 500, a video bitstream (e.g., bitstream 300, 330, or 350, FIGS. 3A-3C) corresponding to a video is received at a client device or system (502). The video includes a sequence of frames with an associated video resolution level. At least a portion of the video bitstream is decoded (504).

In some embodiments, a first portion of the frames, corresponding to a background region of the video (e.g., background region 324), is scaled (506) to a first video resolution level. In some embodiments, a second portion of the frames, corresponding to a window region of the video (e.g., window region 312), is scaled (508) to a second video resolution level. However, in some embodiments or circumstances, only one of the two portions is scaled because the other portion is received at the resolution level needed for displaying that portion of the video.

The background region is displayed (510) at the first video resolution level and the window region is displayed at the second video resolution level. The second video resolution level is higher than the first video resolution level. In some embodiments, the first video resolution level is the video resolution level associated with the frames in the received bitstream; the background region thus is displayed at the video resolution level of these frames, as illustrated in FIG. 3C. In some embodiments, the second video resolution level is the video resolution level associated with the frames in the received bitstream; the window region thus is displayed at the video resolution level of these frames, as illustrated in FIG. 3B. In some embodiments, the first and second video resolution levels are lower than the video resolution level associated with the frames in the received bitstream, as illustrated in FIG. 3A. Alternately, the second and possibly the first video resolution levels are higher than the video resolution level associated with the frames in the received bitstream.

In some embodiments, the window region is surrounded (512) by the background region. For example, the window region 312 in FIGS. 3A-3C is surrounded by the background region 324. In some embodiments, the window region has (514) a user-selected display location. In some embodiments, the background region corresponds (516) to entire frames.

In some embodiments, the second portion of the frames in the received bitstream (i.e., the portion corresponding to the window region) is translated (518). In some embodiments, the second portion is translated in response to receiving user input (e.g., user input 402, FIGS. 4A and 4C), as illustrated in FIGS. 4A-4D. The display location of the window region may remain fixed (524) while the second portion is translated, as shown in FIG. 4D. In some embodiments the second portion is automatically translated based on motion vectors within the second portion or a subset thereof (e.g., within a tracking window 424 (FIG. 4G)), as illustrated in FIGS. 4E-4F. For example, the second portion is shifted from a first location in a first frame (e.g., frame 420-1, FIG. 4G) to a second location in a second, successive frame (e.g., frame 420-2, FIG. 4G) in accordance with an average of motion vectors within the second portion or subset thereof in the first frame. In some embodiments, the second portion is automatically translated as described above with respect to method 450 (FIG. 4H). In some embodiments, a display location of the window region also is automatically translated based on motion vectors within the second portion or a subset thereof (e.g., within a tracking window 424 (FIG. 4G)).

In some embodiments, the display location of the window region is translated (520). In some embodiments, the display location of the window region is translated in response to receiving user input (e.g., user input 402, FIGS. 4A and 4C), as illustrated in FIGS. 4A-4B. The second portion of the frames in the received bitstream (i.e., the portion corresponding to the window region) may be translated (526) along with the display location of the window region, as shown in FIGS. 4A and 4B. In some embodiments, the display location of the window region is automatically translated based on motion vectors within the second portion or a subset thereof (e.g., within a tracking window 424 (FIG. 4G)), as illustrated in FIGS. 4E-4F.

In some embodiments, the first portion of the frames in the received bitstream (i.e., the portion corresponding to the background region 324) may be translated (522). In some embodiments, the first portion is translated in response to receiving user input.

In the method 500 described above, the second video resolution level is higher than the first video resolution. In some embodiments, however, the first video resolution level is higher than the second video resolution level. For example, an entire frame could be displayed at a low resolution in a window region 324 while a portion of the frame is displayed at a higher resolution in a background region 312.

While the method 500 includes a number of operations that appear to occur in a specific order, it should be apparent that the method 500 can include more or fewer operations, which can be executed serially or in parallel (e.g., using parallel processors or a multi-threading environment). An order of two or more operations may be changed and two or more operations may be combined into a single operation. For example, operations 506 and 508 may be performed in parallel; alternately, either operation 506 or operation 508 may be omitted.

The method 500 thus enables different regions of a video to be displayed at different video resolution levels on a device that receives video at only a single resolution. Users are able to zoom in on and pan regions of interests, while still viewing a background region at a lower video resolution level, for videos encoded in conventional single-resolution video formats.

Figure 6:
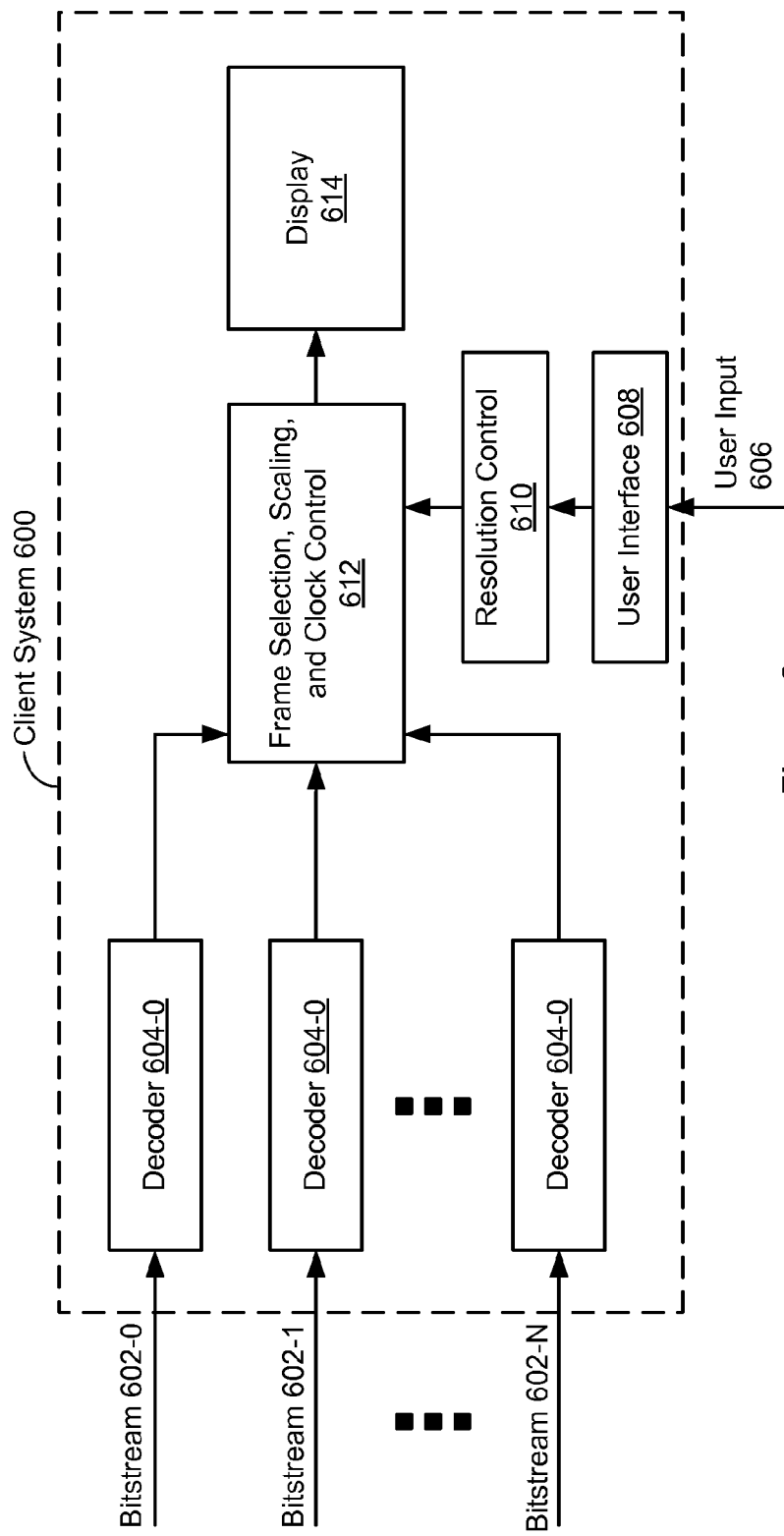
FIG. 6 is a block diagram illustrating a client system that receives multiple bitstreams in accordance with some embodiments.

Attention is now directed to implementations of client systems 102/200 that receive multiple bitstreams corresponding to copies of a video at distinct respective video resolution levels. FIG. 6 is a block diagram illustrating a client system 600 that includes multiple decoders 604-0 through 604-N to decode multiple received bitstreams 602-0 through 602-N or portions thereof in accordance with some embodiments. The multiple video bitstreams 602-0 through 602-N correspond to the same video. The decoders 604-0 through 604-N may be implemented in hardware, in software, or in some combination of hardware and software. For example, in some embodiments each decoder 604 is an integrated circuit (IC) or a portion of an IC (e.g., a core within an IC). In other embodiments, multiple decoders 604 are implemented using a single hardware element or single software library, the output of which is stored in memory in multiple arrays corresponding to multiple respective decoders. For example, each decoder 604 may correspond to a respective thread executed by a multi-threaded processor.

The client system 600 receives user input 606 via a user interface 608 and provides the user input 606 to a resolution control module 610. Based on the user input 606, the resolution control module 610 generates instructions to display different regions of video at different video resolution levels. These instructions are provided to a frame selection, scaling, and clock control module 612, which also receives the decoded bitstreams, or decoded portions of bitstreams, provided by the decoders 604. If frames from a decoded bitstream have a video resolution level selected for a particular region, then the portion of those frames corresponding to the particular region are provided to the display 614 for display in the particular region. Otherwise, frames or portions thereof from a decoded bitstream are selected and scaled to the desired video resolution level for the region; the scaled frames or portions thereof are then provided to the display 614 for display in the particular region. This process is repeated for each region of video to be displayed.

The module 612 synchronizes the frames or portions thereof displayed in different regions of the display 614. For example, the module 612 ensures that the frames or portion thereof displayed at a given instant have matching timestamps. Examples of timestamps that may be associated with respective frames include presentation timestamps and decoding timestamps.

In some embodiments, the number of received bitstreams 602 equals the number of regions to be displayed at distinct video resolution levels on the display 614. In other embodiments, the number of received bitstreams 602 exceeds the number of available regions, such that only a subset of the bitstreams 602 is selected by the module 612. In still other embodiments, the number of received bitstreams 602 is fewer than the number of available regions, such that decoded frames from a single received bitstream 602 are scaled to multiple video resolution levels for display in multiple respective regions.

Figure 7:
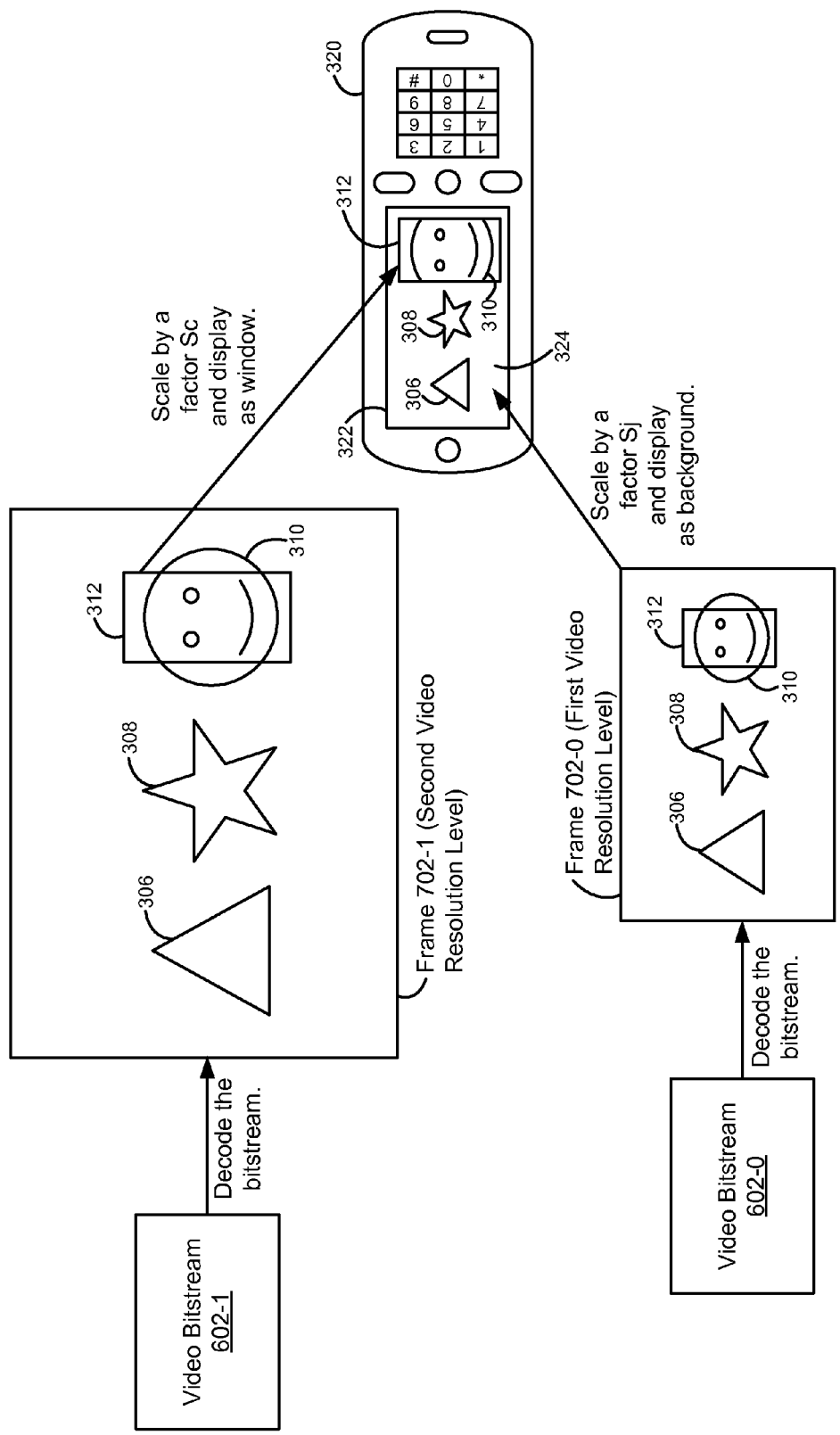
FIG. 7 is a block diagram illustrating receipt of multiple bitstreams with distinct respective video resolution levels and display of corresponding video in accordance with some embodiments.

FIG. 7 is a block diagram illustrating a prophetic example of a client device receiving multiple bitstreams with distinct respective video resolution levels and displaying corresponding video in accordance with some embodiments. A first video bitstream 602-0 is decoded into a sequence of frames, including frame 702-0, at a first video resolution level. A second video bitstream 602-1 is decoded into a sequence of frames, including frame 702-1, at a second video resolution level. The portion of frame 702-0 corresponding to the background region 324 is scaled by a factor Sj and displayed in the background region 324 on the screen 322. Alternately, the entire frame 702-0 is scaled by the factor Sj, but only the portion of the scaled frame that corresponds to the background region 324 is displayed on the screen 322. The portion of frame 702-1 corresponding to the window region 312 is scaled by a factor Sc and displayed in the window region 312 on the screen 322. Alternately, the entire frame 702-1 is scaled by the factor Sc, but only the portion of the scaled frame that corresponds to the window region 312 is displayed on the screen 322.

In some embodiments, the frame 702-0 is not scaled; instead, the portion of the frame 702-0 corresponding to the background region 324 is displayed in the background region 324 on the screen 322. Similarly, in some embodiments the frame 702-1 or a portion thereof is displayed in the window region 312 on the screen 322 without having been scaled.

In some embodiments, multiple window regions 312 may be displayed on the screen 322. The multiple window regions 312 may have the same video resolution level or may have distinct video resolution levels. In some embodiments, the multiple window regions 312 correspond to respective portions of a single sequence of frames. In some embodiments, each of the multiple window regions 312 corresponds to a distinct sequence of frames decoded from a distinct video bitstream 602.

In some embodiments, a portion of the frame 702-1 corresponding to the window region 312 is translated in a manner analogous to the translation illustrated in FIGS. 4A-4B, FIGS. 4C-4D, or FIGS. 4E-4F. For example, the portion of the frame 702-1 corresponding to the window region 312 may be translated in response to received user input (e.g., user input 402, FIG. 4A or 4C). Alternatively, the portion of the frame 702-1 corresponding to the window region 312 may be automatically translated based on motion vectors within the second portion or a subset thereof (e.g., within a tracking window 424, FIG. 4G), for example in accordance with the method 450 (FIG. 4H).

Figure 8:
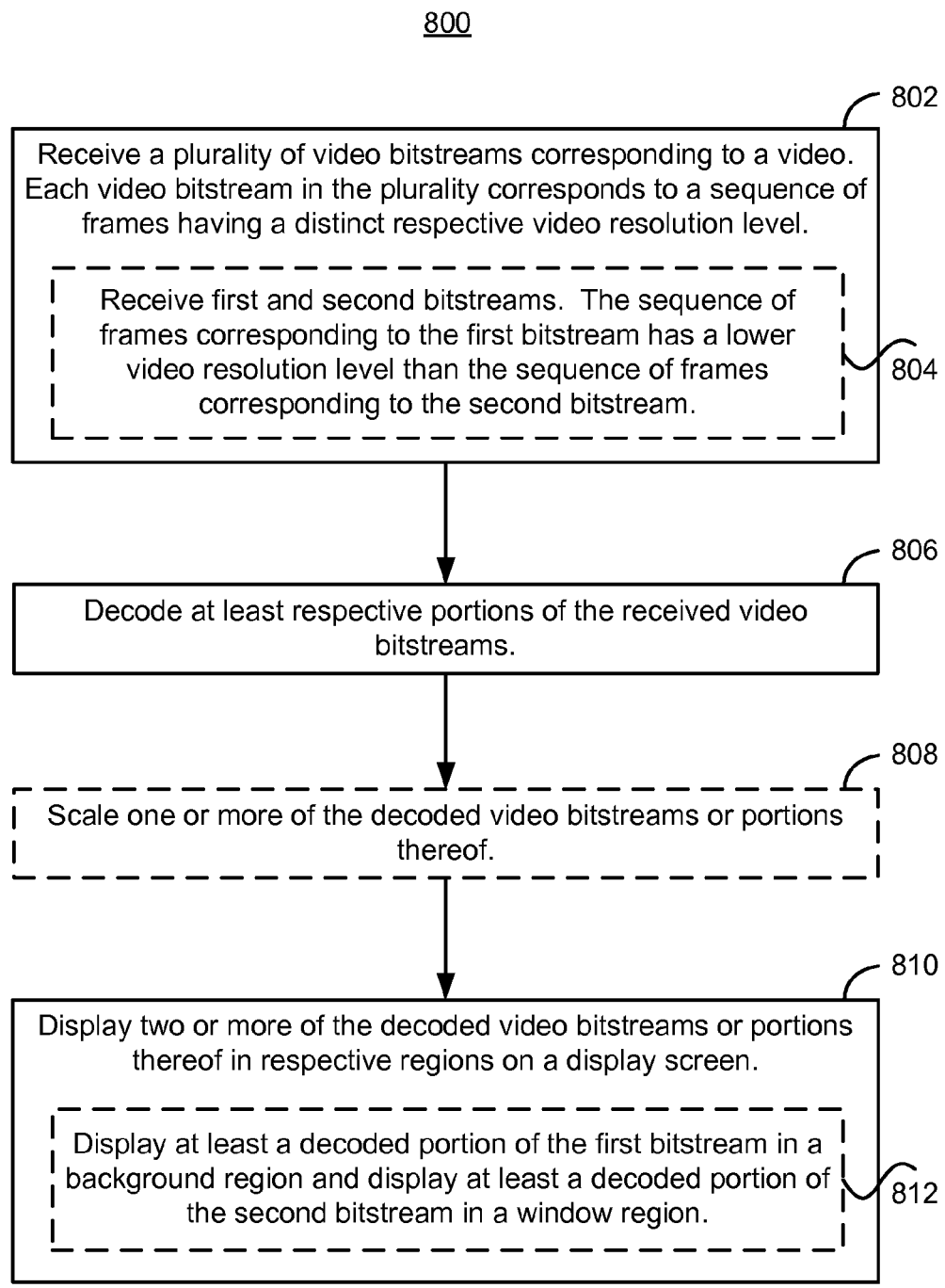
FIG. 8 is a flow diagram illustrating a method of displaying video in accordance with some embodiments.

FIG. 8 is a flow diagram illustrating a method 800 of displaying video in accordance with some embodiments. In the method 800, a plurality of video bitstreams corresponding to a video is received (802). Each video bitstream in the plurality corresponds to a sequence of frames having a distinct respective video resolution level. For example, bitstreams 602-0 through 602-N, each of which has a distinct video resolution level, are received at the client system 600 (FIG. 6).

In some embodiments, receiving the plurality of video bitstreams includes receiving (804) first and second bitstreams. The sequence of frames corresponding to the first bitstream has a lower video resolution level than the sequence of frames corresponding to the second bitstream.

At least respective portions of the received video bitstreams are decoded (806). For example, decoders 604 (FIG. 6) decode respective bitstreams 602 or portions thereof.

In some embodiments, one or more of the decoded video bitstreams or portions thereof are scaled (808). For example, module 612 may scale one or more of the decoded bitstreams received from the decoders 604.

Two or more of the decoded video bitstreams or portions thereof are displayed (810) in respective regions on a display screen (e.g., display screen 322, FIG. 7). In some embodiments, at least a decoded portion of the first bitstream is displayed (812) in a background region (e.g., 324, FIG. 7) and at least a decoded portion of the second bitstream is displayed in a window region (e.g., 312, FIG. 7). In some embodiments, the window region has a user-selected display location.

The method 800 thus enables a client device to receive video at multiple resolutions and to display different regions of the received video at distinct resolutions. While the method 800 includes a number of operations that appear to occur in a specific order, it should be apparent that the method 800 can include more or fewer operations, which can be executed serially or in parallel. An order of two or more operations may be changed and two or more operations may be combined into a single operation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying video, comprising:
   receiving a video bitstream corresponding to a video, the video comprising a sequence of frames having a single associated video resolution level;
   decoding at least a portion of the video bitstream; and
   displaying a background region of the video at a first video resolution level and a window region of the video at a second video resolution level; wherein the second video resolution level is higher than the first video resolution level and wherein the associated video resolution is no less than the second video resolution.

2. The method of claim 1, wherein the window region is surrounded by the background region.

3. The method of claim 1, wherein the background region corresponds to entire frames in the sequence of frames.

4. The method of claim 1, wherein the second video resolution level is the associated video resolution level.

5. The method of claim 1, wherein the first and second video resolution levels are lower than the associated video resolution level.

6. The method of claim 1, wherein the background region corresponds to a first portion of the frames and the window region corresponds to a second portion of the frames, the method further comprising:
   scaling the first portion to the first video resolution level; and
   scaling the second portion to the second video resolution level.

7. The method of claim 1, wherein the window region has a user-selected display location.

8. The method of claim 7, further comprising:
   receiving user input corresponding to an instruction to translate the display location; and
   in response to the user input, translating the display location.

9. The method of claim 8, wherein the background region corresponds to a first portion of the frames and the window region corresponds to a second portion of the frames, the method further comprising:
   translating the second portion in response to the user input.

10. The method of claim 1, wherein the background region corresponds to a first portion of the frames and the window region corresponds to a second portion of the frames, the method further comprising:
    receiving user input corresponding to an instruction to translate the second portion; and
    in response to the user input, translating the second portion.

11. The method of claim 10, wherein a display location of the window region remains fixed during the translating.

12. The method of claim 1, wherein the background region corresponds to a first portion of the frames and the window region corresponds to a second portion of the frames, the method further comprising:
   receiving user input corresponding to an instruction to translate the first portion; and
   in response to the user input, translating the first portion.

13. The method of claim 1, wherein the background region corresponds to a first portion of the frames and the window region corresponds to a second portion of the frames, the method further comprising:
   automatically translating the window region based on motion vectors within the second portion or a subset thereof.

14. The method of claim 13, wherein the translating includes shifting the window region from a first location in a first frame to a second location in a second, successive frame in accordance with an average of motion vectors within the window region or subset thereof in the first frame.

15. The method of claim 14, wherein the average of motion vectors is a weighted average.

16. The method of claim 13, further comprising automatically translating a display location of the window region based on the motion vectors.

17. A device for displaying video, comprising:
   memory;
   one or more processors;
   one or more programs stored in the memory and configured for execution by the one or more processors, the one or more programs including:
      instructions to receive a video bitstream corresponding to a video, the video comprising a sequence of frames having a single associated video resolution level;
      instructions to decode at least a portion of the video bitstream; and
      instructions to display a background region of the video at a first video resolution level and a window region of the video at a second video resolution level; wherein the second video resolution level is higher than the first video resolution level, and wherein the associated video resolution level is no less than the second video resolution level.

18. The device of claim 17, wherein the device is a set-top box, personal computer, or portable electronic device.

19. A computer readable storage medium storing one or more programs for use in displaying video, the one or more programs configured to be executed by a device for displaying video, the one or more programs comprising:
   instructions to receive a video bitstream corresponding to a video, the video comprising a sequence of frames having a single associated video resolution level;
   instructions to decode at least a portion of the video bitstream; and
   instructions to display a background region of the video at a first video resolution level and a window region of the video at a second video resolution level; wherein the second video resolution level is higher than the first video resolution level, and wherein the associated video resolution level is no less than the second video resolution level.

20. A device for displaying video, comprising:
   means for receiving a video bitstream corresponding to a video, the video comprising a sequence of frames having a single associated video resolution level;
   means for decoding at least a portion of the video bitstream; and
   means for displaying a background region of the video at a first video resolution level and a window region of the video at a second video resolution level; wherein the second video resolution level is higher than the first video resolution level, and wherein the associated video resolution level is no less than the second video resolution level.

* * * * *